Patented May 16, 1939

2,158,724

UNITED STATES PATENT OFFICE 2,158,724

STABILIZED COMPOSITION

Lowell B. Kilgore, Washington, D. C., assignor to Kilgore Development Corporation, Washington, D. C., a corporation of Virginia No Drawing. Application March 28, 1936, Serial No. 71,512

6 Claims. (Cl. 167—22)

This invention relates to the fortifying of organic substances to prevent or retard oxidative deterioration.

One of the objects of the invention is the treatment of such organic substances or compounds as are subject to spontaneous oxidation or in other words, such organic compounds in which peroxides are formed by exposure to light or air, with compounds belonging to the following classes of organicals which I have found to be effective for such purposes.

(1) Esters of epsilon-substituted, gamma-keto, delta, epsilon-unsaturated acids of the general formula:

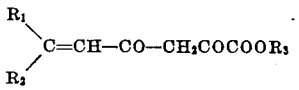

wherein, $R_1$ and $R_2$ are organic radicals, and $R_3$ is any organic radical forming an ester with the carboxyl group.

Other objects of the invention relate to the production of organic compounds ordinarily susceptible to oxidative deterioration fortified by one or more of the compounds belonging to the above class of organic chemicals.

Still another object of the invention relates to the production of the anti-oxidant per se.

Other objects of the invention will appear as the following disclosure of the invention proceeds.

Organic compounds which are subject to the spontaneous formation of organic peroxides range from those containing a substantial proportion of oxidizable substance, for example, glycerides containing unsaturated fatty acid radicals, in which the phenomena of oxidative deterioration take the form of rancidity, to substances such as vegetable extractives in which oxidation results in loss in strength of those peculiar properties which normally characterize such substances and for which they are desired. By way of example, rotenone, an extractive from the roots of the plants Derris and Lonchocarpus, and dihydrorotenone, a direct derivative from rotenone, are valuable for their insect toxic properties which quality, however, rapidly deteriorates through oxidation when the rotonone or dihydrorotenone is kept in solution in contact with oxygen.

In preparing oxidation inhibiting compounds of the above class, I may proceed as follows. The members of this class may be prepared by Claisen condensation, of a beta-gamma-unsaturated methyl ketene, with one molecule of an oxalic ester, the condensation being effected by one atom of metallic sodium according to the general formula. The resulting unsaturated keto ester may exist in two or more isomeric modifications, the enol form of which is useful in the present invention. In many cases, however, this enol tautomer is not conveniently separable from the equilibrium mixture of the corresponding isomeric forms in which instances the equilibrium mixture is used, wherein the non-enolic isomers present cause no detriment to the resulting fortifying effect.

The reaction may be represented as follows:

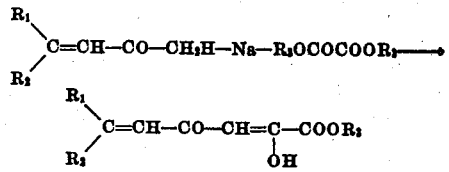

I have made, for anti-oxidant purposes, in enol form, the following compounds belonging to the above series of esters shown by the general formula: acetalacetone oxalate, ethyl ester; acetalacetone oxalate, n-butyl ester; benzalacetone oxalate, ethyl ester; benzalacetone oxalate, n-butyl ester; furfuralacetone oxalate, ethyl ester; β-ionone oxalate, ethyl ester; mesityl oxide oxalate, methyl ester; mesityl oxide oxalate, ethyl ester; mesityl oxide oxalate, n-butyl ester; mesityl oxide oxalate, iso-butyl ester; mesityl oxide oxalate, sec-butyl ester; mesityl oxide oxalate, n-propyl ester; mesityl oxide oxalate, iso-propyl ester; mesityl oxide oxalate, n-amyl ester; mesityl oxide oxalate, sec-amyl ester; mesityl oxide oxalate, iso-amyl ester; mesityl oxide oxalate, benzyl ester; mesityl oxide oxalate, cyclohexyl ester; crotonal acetone oxalate, ethyl ester; pseudoionone oxalate, ethyl ester; and mesityl oxide oxalate, tetrahydrofurfuryl ester.

Some I have tested with substances containing substantial amounts of unsaturated fatty acids and some I have tested with vegetable extractives such as rotenone. In making the test with fatty glycerides, I selected three common edible vegetable oils, namely, corn, cotton seed and olive oil, the oxidative deterioration of these oils was inhibited by the addition of about one-tenth of one percent by weight of certain members of the above synthetic organicals.

This was shown by the use of an accelerated oxidation test which is widely used in the edible oil and fat industries as a method of evaluating the keeping qualities of oils and fats susceptible to oxidative deterioration. The particular method I have used in my researches is described by D. H. Wheeler, "Oil and Soap", vol. 9, pp. 89–97, (1932) and later improved by King et al. (ibid.) vol. 10, pp. 105–9 (1933). This test consists of a method of oxidizing a fatty oil wherein air is constantly blown through the oil or fat held at a constant elevated temperature for a definite time. The extent to which the oil or fat has oxidized by this treatment is then determined qualitatively by an iodometric titration of the peroxides formed. A comparison of these peroxide values so determined on treated and untreated fatty oil which had been blown under identical conditions, shows the relative protective factor given by the chemical inhibitor used under the specific conditions.

The following table shows the results of the test of the specified chemical inhibitors, in a fatty oil, e. g. corn oil. The accelerated temperature used in all cases was 100° C.±0.2 and the time of air blowing was five hours. The peroxide values are stated in millimoles of oxygen per kilo of oil, (cf. 10c. cit.):

| Chemical inhibitor used | Peroxide control | Values sample | Protection factor |
|---|---|---|---|
| Acetalacetone oxalate, ethyl ester | 23.0 | 2.5 | 9.2 |
| Benzalacetone oxalate, ethyl ester | 28.5 | 3.3 | 8.6 |
| Benzalacetone oxalate, n-butyl ester | 42.2 | 22.0 | 1.9 |
| Furfuralacetone oxalate, ethyl ester | 28.1 | 8.9 | 3.2 |
| β-ionone oxalate, ethyl ester | 29.2 | 13.6 | 2.1 |

Similar results were obtained when using these inhibitors in other oils, namely, cotton seed, soy bean and olive oil.

The examples given in the above table illustrate the diverse nature of the substituents indicated in the general formula of the class of chemical compounds referred to in this application. They have been so selected that a skilled chemist would appreciate the scope of the invention wherein suitable substitutions may be made as indicated in the general formula.

As a specific example of a compound containing a fatty glyceride, fortified against oxidative deterioration by one of the synthetic compounds produced by this invention, I have made a commercial type, mayonnaise, using cotton seed oil which has been fortified against the development of oxidative rancidity by the addition of .05% of normal butyl ester of benzalacetone oxalate. Samples of this mayonnaise stored in glass jars exposed to the light from a north window were in good condition after a month, while similar mayonnaise made without the inclusion of the inhibitor was rancid by odor and taste.

Although it may appear that there is but little in common between the glycerides or glyceride-containing compounds and such compounds as the vegetables extractives in which fatty constituents are present to almost a negligible extent, I have been able to prove conclusively that they have a generic relationship to the glycerides insofar as the purpose of the present invention are concerned in that they react spontaneously, that is to say, under normal conditions with oxygen to produce organic peroxides. By experiment, I have shown that the oxidative deterioration of rotenone and dihydrorotenone involves the formation of organic peroxides as evidenced by their reaction with potassium iodide in solution whereby iodine is liberated. The amount or extent of the reaction is readily evaluated by the customary iodometric procedure such as titration with sodium thiosulphate. I may cite as an example the following results:

The solutions of rotenone and of dihydrorotenone shown in Table I were exposed to diffuse light until the control samples were a deep yellow color. The extent of peroxide formation caused by the oxidation of the rotenone or dihydrorotenone, was then determined in each case by the following procedure.

Five cubic centimeters of the sample was added to 20 cubic centimeters of a 40/60 mixture of chloroform and glacial acetic acid as a solvent. Ten drops of saturated aqueous potassium iodide was then added, shaken, allowed to stand one-half minute to react, diluted to about 100 cubic centimeters with water and the liberated iodine titrated with n/100 sodium thiosulphate.

Table I.—Rotenone and dihydrorotenone peroxides

| Inhibitor used | Amount n/100 Na₂S₂O₃ |
|---|---|

*(a) Rotenone in acetone (0.5% solution)*

| | Cubic centimeters |
|---|---|
| No inhibitor, control | 0.60 |
| 5% acetalacetone oxalate, n-butyl ester | 0.20 |
| 5% mesityl oxide oxalate, iso-butyl ester | 0.05 |
| 5% mesityl oxide oxalate, sec-butyl ester | 0.05 |
| 5% mesityl oxide oxalate, n-amyl ester | 0.10 |

*(b) Rotenone in ethylene dichloride (2% solution)*

| No inhibitor, control | 1.00 |
|---|---|
| 0.5% benzalacetone oxalate, n-butyl ester | 0.50 |

*(c) Dihydrorotenone in acetone (0.5% solution)*

| No inhibitor, control | 0.50 |
|---|---|
| 5% mesityl oxide oxalate, n-butyl ester | 0.05 |
| 5% mesityl oxide oxalate, n-amyl ester | 0.10 |

*(d) Dihydrorotenone in ethylene dichloride (0.5% solution)*

| No inhibitor, control | 0.80 |
|---|---|
| 5% mesityl oxide oxalate, n-butyl ester | 0.25 |

As another example, the series shown in the following table were irradiated by means of a carbon arc lamp and were titrated in the manner described above.

Table II

| Solution* irradiated | Ccs. n/100 sodium thiosulphate |
|---|---|
| 0.5% rotenone | 0.6 |
| 0.5% rotenone+5% acetalacetone oxalate, n-butyl ester | 0.2 |
| 0.5% rotenone+5% mesityl oxide oxalate, n-amyl ester | 0.1 |
| 0.5% rotenone+5% mesityl oxide oxalate, sec-butyl ester | 0.05 |
| 0.5% rotenone+5% mesityl oxide oxalate, iso-butyl ester | 0.05 |
| 0.5% dihydrorotenone | 0.5 |
| 0.5% dihydrorotenone+5% mesityl oxide oxalate, n-butyl ester | 0.05 |
| 0.5% dihydrorotenone+5% mesityl oxide oxalate, n-amyl ester | 0.1 |

*All solutions in ethylene dichloride.

Similar results were obtained using sunlight as the irradiation, however due to the inherent variation in the intensity of sunlight, the values obtained on different days were not considered as comparable as those obtained by means of controlled artificial irradiation.

It is well known that rotenone, dihydrorotenone and other related organicals such as are present in organic extracts from Derris and Cube' roots are valuable as insecticides. The wide spread usage of these compounds has been seriously limited due largely to two adverse properties, namely, the ease whereby these botanicals and immediate derivatives are oxidized in the air and light causing a loss in their insecticidal properties. A second difficulty limiting the use of rotenone and the like is its insolubility in suitable vehicles for use as an insecticide spray, thus preventing an economical and commercial use of these valuable compounds. Although many solvents have been and are being used for rotenone, the rate of deterioration in such solvents is always greater than that of the dry crystalline retenone or dihydrorotenone. The commercial importance of the discovery of such a complementary substance to rotenone, dihydrorotenone and the like which the present invention affords, whereby these valuable insecticides are stabilized and protected under conditions essential to their usage is readily appreciated by those skilled in the art.

Now it is quite apparent from the foregoing examples that the insecticidal potency of rotenone, dihydrorotenone or other insect toxic vegetable extractives in solution may be effectively protected or fortified by the presence in solution of an ester belonging to the class of compounds coming within the purview of this invention.

The protective and stabilizing effects of these esters upon rotenone and dihydrorotenone in solution is also shown by their inhibition or retardation of the development of a yellow color in such solutions, the formation of this color being due to the highly colored oxidation products of rotenone and dihydrorotenone. Since these colored oxidation products have little or no insecticidal value their formation depletes the value of the solution as an insecticide. Davidson and Jones, J. Econ. Entom. 24, 257 (1931) states:

"Rotenone has been found to decompose at various rates when allowed to stand in solution in certain solvents, the decomposition being evidenced by development of a yellow color * * *. This change is accompanied by a loss in toxicity to insects, as shown by entomological tests made with aqueous suspensions prepared from these solutions."

also the work of Jones and Haller, Journal of the American Chemical Society, 53, 2320-4 in which it states:

"It was noted that solutions of rotenone in certain organic solvents changed, on standing, from colorless to various depths of yellow.

"* * * this alteration in color is accompanied by a change in the optical rotation of the solution, the rate of the two changes being roughly proportional. The solutions also lose their toxicity to fish and insects."

In the work of Jones, et al., J. Econ. Entomology, 26, 451, (1933), it states:

"As already mentioned, rotenone in solution in organic solvents is oxidized to non-toxic, yellow decomposition products."

*Example*

To 25 cc. of a 0.5 percent solution of rotenone in acetone, was added 1.25 grams of one of the esters enumerated below. In all cases, excepting the methyl ester, an equilibrium mixture of the tautomeric forms was used. In instances where the esters produced a colored solution, duplicate samples were prepared, one of which was stored in the dark for colorimetric comparison with the corresponding irradiated sample:

*Acetone solutions*

| Inhibitor used | Appearance after irradiation |
|---|---|
| Control, no inhibitor | Straw yellow color. |
| Mesityl oxide oxalate, methyl ester* | Colorless. |
| Mesityl oxide oxalate, ethyl ester** | Very faint yellow. |
| Mexityl oxide oxalate, n-butyl ester** | Colorless. |

*Enol form.
**Equilibrium mixture.

Similar experiments were made using a .5 percent solution of rotenone or dihydrorotenone in ethylene dichloride. After two hours irradiation, the control sample containing no inhibitor was yellow, while the samples protected by the addition of normal butyl and normal amyl esters of mesityl oxide oxalate were found to be colorless after the same period of irradiation. The comparative results were as follows:

*Ethylene dichloride solutions*

| Inhibitor used | Appearance after irradiation |
|---|---|
| Control, no inhibitor | Straw yellow color. |
| Mesityl oxide oxalate, iso-butyl ester | Colorless. |
| Mesityl oxide oxalate, sec-butyl ester | Do. |
| Mesityl oxide oxalate, n-butyl ester | Do. |

Although the above examples involve the use of esters of one acid, namely, mesityl oxide oxalic acid, other delta-epsilon unsaturated, gamma ketonic acids may be employed which give esters existing in whole or in part in the enolic or alpha form. Other such esters which I have tested and found to be effective in protecting and stabilizing rotenone and the like are those of acetalacetone oxalic acid, beta-ionone oxalic acid, and benzalacetone oxalic acid.

Although I have shown the structural formula of this class of esters in the keto- or beta-form and not the enol- or alpha-form in which they are operative, it is done because these compounds are so expressed in the literature. It is therefore expressly understood that enol form is contemplated in this invention.

What I claim is:

1. Organic compound susceptible to spontaneous reaction with oxygen to form organic peroxides, stabilized by being brought into combination with a compound of the class of organic chemicals known as enol tautomers of esters of epsilon-substituted, alpha, gamma-diketo, delta, epsilon-unsaturated acids, wherein the epsilon substituents may include hydrogen, an alkyl radical, a heterocyclic radical, a carbocyclic radical, or an unsaturated aliphatic radical.

2. Organic compound susceptible to spontaneous reaction with oxygen to form organic peroxides, stabilized by being brought into combination with a compound from the class of organic chemicals known as esters of epsilon-substituted, alpha, gamma-diketo, delta, epsilon-unsaturated acids of the genral formula:

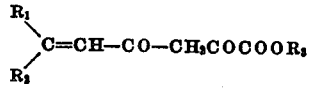

in which $R_1$ and $R_2$ are organic radicals, wherein the epsilon substituents may include hydrogen, an alkyl radical, a heterocyclic radical, a carbocyclic radical, or an unsaturated aliphatic radical, and $R_3$ is any organic radical forming an ester of the carboxyl group.

3. Vegetable extractive selected from the group consisting of pyrethrins, rotenone, dihydrorotenone, having insecticidal properties and susceptible to spontaneous reaction with oxygen to form organic peroxides in combination with a stabilizing compound of the class known as enol tautomers of esters of epsilon-substituted, alpha, gamma-diketo, delta, epsilon-unsaturated acids, wherein the epsilon substituents may include hydrogen, an alkyl radical, a heterocyclic radical, a carbocyclic radical, or an unsaturated aliphatic radical.

4. Vegetable extractive selected from the group consisting of pyrethrins, rotenone, dihydrorotenone having insecticidal properties, and susceptible to spontaneous reaction with oxygen to form organic peroxides, in combination with a stabilizing compound from the class known as esters of epsilon-substituted, alpha, gamma-diketo, delta, epsilon-unsaturated acids of the general formula:

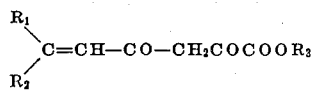

in which $R_1$ and $R_2$ are organic radicals, wherein the epsilon substituents may include hydrogen, an alkyl radical, a heterocyclic radical, a carbocyclic radical, or an unsaturated aliphatic radical, and $R_3$ is any organic radical forming an ester of the carboxyl group.

5. Insect toxic substance selected from the group consisting of: pyrethrins, rotenone, dihydrorotenone, and which are susceptible to spontaneous reaction with oxygen, in solution, forming organic peroxides, in combination with a stabilizing substance selected from the following esters, enol form of the group consisting of: acetalacetone oxalate, ethyl ester; acetalacetone oxalate, n-butyl ester; benzalacetone oxalate, ethyl ester; benzalacetone oxalate, n-butyl ester; furfuralacetone oxalate, ethyl ester; β-ionone oxalate, ethyl ester; mesityl oxide oxalate, methyl ester; mesityl oxide oxalate, ethyl ester; mesityl oxide oxalate, n-butyl ester; mesityl oxide oxalate, iso-butyl ester; mesityl oxide oxalate, sec-butyl ester; mesityl oxide oxalate, n-propyl ester; mesityl oxide oxalate, iso-propyl ester; mesityl oxide oxalate, n-amyl ester; mesityl oxide oxalate, sec-amyl ester; mesityl oxide oxalate, iso-amyl ester; mesityl oxide oxalate, benzyl ester; mesityl oxide oxalate, cyclohexyl ester; crotonal acetone oxalate, ethyl ester; pseudo-ionone oxalate, ethyl ester; mesityl oxide oxalate, tetrahydrofurfuryl ester.

6. Organic compound susceptible to spontaneous reaction with oxygen to form organic peroxides, in combination with a stabilizing substance selected from the group consisting of the following enol esters: acetalacetone oxalate, ethyl ester; acetalacetone oxalate, n-butyl ester; benzalacetone oxalate, ethyl ester; benzalacetone oxalate, n-butyl ester; furfuralacetone oxalate, ethyl ester; β-ionone oxalate, ethyl ester; mesityl oxide oxalate, methyl ester; mesityl oxide oxalate, ethyl ester; mesityl oxide oxalate, n-butyl ester; mesityl oxide oxalate, iso-butyl ester; mesityl oxide oxalate, sec-butyl ester; mesityl oxide oxalate, n-propyl ester; mesityl oxide oxalate, iso-propyl ester; mesityl oxide oxalate, n-amyl ester; mesityl oxide oxalate, sec-amyl ester; mesityl oxide oxalate, iso-amyl ester; mesityl oxide oxalate, benzyl ester; mesityl oxide oxalate, cyclohexyl ester; crotonal acetone oxalate, ethyl ester; pseudo-ionone oxalate, ethyl ester; mesityl oxide oxalate, tetrahydrofurfuryl ester.

LOWELL B. KILGORE.